Aug. 30, 1932.  A. PILNY  1,874,615
THREE-COLOR FILM FOR CINEMATOGRAPHIC PURPOSES
Filed Oct. 23, 1929
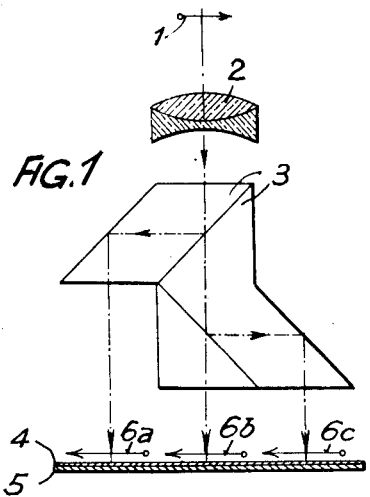
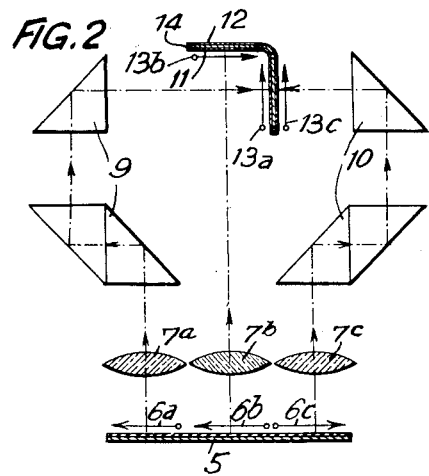
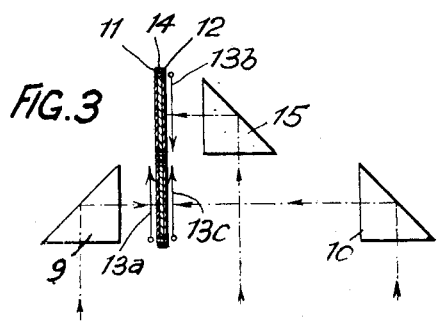
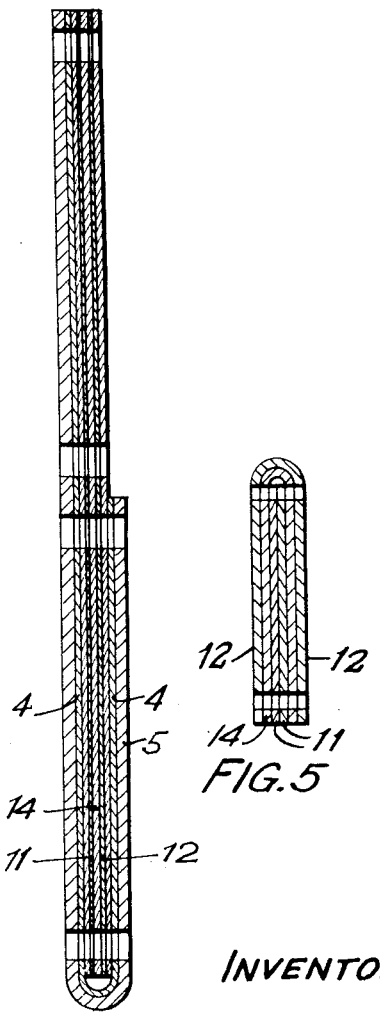
INVENTOR:
Alex Pilny
by Henry Orthey
atty.

Patented Aug. 30, 1932

1,874,615

UNITED STATES PATENT OFFICE

ALEX PILNY, OF ZURICH, SWITZERLAND

THREE-COLOR FILM FOR CINEMATOGRAPHIC PURPOSES

Application filed October 23, 1929, Serial No. 401,838, and in Germany October 30, 1928.

The present invention relates to three color films for cinematographic purposes and has for its object to provide a method of producing a film of this type, whereby the recomposition of the image is to be effected by a subtractive method. It has been repeatedly proposed to project three color-records or component pictures of an image, which are suitably colored, in superimposed position. Thereby great difficulty is encountered in placing the three component pictures exactly in register. It is also known to project two component pictures of an image, one on the front side and one on the rear side of a film which is sensitized to light on both sides, but in this case, the difficulty of registering the third component picture with the two others still exists.

The method according to the present invention eliminates the above said disadvantages in that three component pictures of an image which are arranged on a film are projected in such manner onto the front and the rear side respectively of another film, which is sensitized on both sides, that two of the compound pictures are in register and the third component picture is made to register with the other two component pictures by folding the film longitudinally.

On the accompanying drawing several arrangements for carrying the method according to the invention into effect are illustrated by way of example, in which Fig. 1 shows diagrammatically a device for recording three component pictures of an image on a film, and Fig. 2 a further device for producing a cinematograph film according to the invention;

Fig. 3 is a modified form of a device such as shown in Fig. 2;

Fig. 4 shows, alternatively in section the production of a cinematograph film according to the invention, and Fig. 5 is a section of a finished film according to the invention.

Three individual component pictures of an object are simultaneously recorded on a film 5 in any suitable manner. For taking the component pictures, for instance, a device such as shown in Fig. 1 may be used. The rays of light emanating from an object 1 pass through an objective 2 to a system of prisms 3, which in known manner is provided with several surfaces for splitting the bundles of rays impinging thereon, suchwise, that on the sensitive coating 4 of the film 5 three component pictures 6a, 6b, 6c are recorded which differ from each other only in that they are of different color-sensation in that in the path of each of the three groups of rays, each of which is producing a color record, a filter for a different color is arranged. The pictures thus obtained are directed in the same direction. In Fig. 1 three component pictures 6a, 6b and 6c are shown to be arranged beside each other. Alternatively, they may be arranged in any other manner, for instance, some or all of them below one another.

In order to produce a three color film from the said component pictures 6a, 6b and 6c, which is adapted to be subjected to a subtractive method, the film 5 containing the three individual component pictures 6a, 6b and 6c is illuminated by a source of light, not shown. To each component picture 6a, 6b and 6c a system of lenses 7a, 7b and 7c is allotted. In the embodiment of the invention, as shown in Fig. 2, the component pictures 6a and 6c are projected by the sets of lenses 7a and 7c and the sets of prisms 9 and 10 respectively onto the front and rear side of a film 14 which is provided on both of its sides with sensitive layers 11 and 12 respectively and the width of which is twice the width of the image. The two component pictures 13a and 13c are uni-directional and in register. The third original component picture 6b is projected by its allotted lens system 7b directly onto the sensitive layer 11 of the film, whereby, in this case it is necessary that the image plane at the point of incidence of the corresponding bundle of rays is perpendicular to the planes of the color records 13a and 13c. This is attained by bending the film 14 in its longitudinal direction to an angle of 90°.

The individual component pictures 13 are then colored in a known manner adapted for a subtractive reproduction of the image. By completely folding the film 14 down on itself, about a longitudinal edge, the three color records 13a, 13b and 13c can be made to register. The preliminary folding of the film 14 and the provision of the usual perforations in the same ensure that all the three component pictures 13a, 13b and 13c coincide in exact register when the film is completely folded over.

In the embodiment, as shown in Fig. 3, the film 14 is not bent at right angles, but remains plane. The component pictures 13a and 13c are produced in the above described manner, whilst for the component picture 13b a prism system 15 is provided which deviates its corresponding bundle of rays at an angle of 90°, whereby the image plane of the component picture 13b is made to register with the plane of component picture 13c. To ensure that in this case all the three component pictures can subsequently be made to register the film 14 may be preliminarily folded and subsequently be bent back into a plane.

The film may also be preliminarily folded, then straightened out again and subsequently be bent back to the extent of a small angle only, in which case the system of prisms 15 are required to be of special shape.

A further possible manner of carrying the method into effect consists in that, as shown in Fig. 4, the component pictures 6 are copied off on the film 14 by a contact method.

For this purpose the film 5 is folded over the film 14 so that two of the component pictures contained thereon are superimposed on each other on different sides of the film 14 and the third component picture is placed beside one of the same on one side of the film 14. With this method, again two component pictures are directly registered and the third one is subsequently made to register with the two other component pictures by folding the film down on itself in the longitudinal direction, as aforesaid.

The described method is based on the condition that the original component pictures are of standard size such as required for the reproduction of the image by projection.

I claim:

1. In a method of producing three color cinematograph films the steps which comprise printing two of three component pictures of an image, said three component pictures, being arranged on a film in register on the front and rear side respectively of the one longitudinal half of another film which is sensitized on both sides, simultaneously printing the third component picture of the said image onto one of the sides of the other longitudinal half of the said other film and longitudinally folding the said other film so that the third component picture is in register with the two other component pictures.

2. In a method of producing three color cinematograph films the steps which comprise arranging three component pictures of an object beside each other on a first film, longitudinally folding said first film so that two of the said three component pictures are in register, inserting a second film sensitized on both sides in the fold of said first film with the respective surfaces of said two films contacting, printing two of said three component pictures on said first film in register on opposite sides of said second film and the third component picture on the respective side of said second film, and longitudinally folding said second film so that the third component picture is in register with the two other component pictures.

3. In a three color cinematographic film comprising an image support, two component pictures of an object arranged in register on opposite sides of the one longitudinal half of said support, and the third component picture arranged on the other half of said support, said other half being bent down on said first half so that the third component picture is in register with the two other component pictures.

In testimony whereof I have signed my name to this specification.

ALEX PILNY.